United States Patent [19]
Koch

[11] Patent Number: 5,877,269
[45] Date of Patent: Mar. 2, 1999

[54] ORGANIC ESTER PLASTICIZERS

[75] Inventor: Russell W. Koch, Hartville, Ohio

[73] Assignee: Bridgestone Corporation, Tokyo, Japan

[21] Appl. No.: 994,666

[22] Filed: Dec. 19, 1997

[51] Int. Cl.$^6$ ...................................................... C08G 63/00
[52] U.S. Cl. ........................... 528/176; 528/271; 528/272
[58] Field of Search ..................................... 528/176, 271, 528/272

[56] References Cited

U.S. PATENT DOCUMENTS 4,968,775  11/1990  Toman et al. ............................ 528/300
5,175,237  12/1992  Jones ....................................... 528/272

*Primary Examiner*—Terressa Mosley
*Attorney, Agent, or Firm*—Daniel N. Hall

[57] ABSTRACT

An organic ester suitable as a plasticizer is made from a glycol, a dicarboxylic acid, and an alcohol. The compound can be prepared in the presence of an organic solvent either by a one step route wherein the glycol, carboxylic acid, and alcohol are added together and reacted, or by a two step route wherein first the dicarboxylic acid is reacted with the glycol and the resulting acid ester is subsequently reacted with the alcohol. The end product is suitable as a plasticizer for rubbers such as neoprene wherein it has low volatility and imparts improved peel adhesion.

20 Claims, No Drawings

ORGANIC ESTER PLASTICIZERS

FIELD OF INVENTION

The present invention relates to compounds suitable as plasticizers which have low volatility and good compatibility with rubber formulations.

BACKGROUND OF THE INVENTION

Heretofore, various plasticizers have been commonly utilized to plasticize polyvinyl chloride and other polymers. Typical plasticizers have included phthalate esters, phosphate esters such as tricresyl phosphate, adipates, azelates, oleates, and sebacates, various epoxy plasticizers; fatty acid esters derived from natural sources, and the like. Dioctyl sebaccate has been utilized as a plasticizer for neoprene.

SUMMARY OF INVENTION

Compounds of the present invention, which are suitable as plasticizers can be prepared in either a one step or a two step procedure. The first step of a two step reaction route is to condense approximately one mole of a glycol with approximately two moles of a dicarboxylic acid. A catalyst is generally utilized and the reaction is carried out in an organic solvent. Reaction can occur at the reflux temperature of the solvent until the theoretical amount of water produced by the condensation reaction is collected. The solvent can then be removed by distillation. In the second step, the product of the first step is added to an organic solvent and an alcohol added. The solution is then heated as to the reflux temperature of the solvent and water removed from the condensation reaction. The product can then be extracted, neutralized, dried, and the like.

In the one-step route, a dicarboxylic acid, a glycol, and an alcohol with a small amount of a catalyst is added to a reaction vessel containing a solvent. The mixture is heated as to the refluxed temperature of the solvent with water being collected from the ester formation reaction. The solvent is then removed as by distillation and the resulting solution generally neutralized, filtered, dried and the like to recover the product.

Regardless of whether a single step or a two-step reaction route is followed, the resulting ester end product is substantially the same.

The organic ester product can be compounded with a rubber such as neoprene, carbon black, suitable processing aids, antioxidants, and the like to produce a rubber master batch. The master batch is subsequently compounded with vulcanizing agents, accelerators, and the like, and cured.

DETAILED DESCRIPTION

The glycols utilized in the present invention are desirably saturated and contain a total of from 2 to about 60 carbon atoms. The glycols can either be a hydrocarbon glycol or an ether glycol. The hydrocarbon glycols can be long chained but desirably are short chained containing a total of 2 to about 10 carbon atoms with representative examples including ethylene glycol, propylene glycol, trimethylene glycol, butylene glycol, and the like, including various isomers thereof. Desirably, the glycol is an ether glycol inasmuch as it contains one or more groups, for example, from about 2 to about 20 ether repeat groups and has a total of 2 to about 40 carbon atoms. Representative examples include tetramethylene glycol, diethylene glycol, triethylene glycol, tetraethylene glycol, and the like. Tetraethylene glycol is preferred.

The dicarboxylic acids are desirably saturated aliphatic acids and often long-chained and thus contain a total of from 2 to about 20 carbon atoms and preferably from about 8 to about 14 carbon atoms. Representative examples of dicarboxylic acids include succinic acid, glutaric acid, adipic acid, pimelic acid, suberic acid, azelaic acid, sebaccic acid, dodecanoic acid, and the like. Often, it is desirable to use mixtures of two or more dicarboxylic acids. Preferred acids include sebaccic and dodecanoic acids. High purity acids are desired inasmuch as the same result in less side reactions and the product generally has better properties. An approximate equivalent amount of the dicarboxylic acid is utilized to completely react each glycol molecule. Thus, from about 1.9 to about 2.1 moles, desirably from about 1.95 to about 2.05 moles, and preferably about 2.0 moles of dicarboxylic acid is utilized for each mole of glycol. The ester formation resulting from the reaction of the diacid with the glycol, i.e., two acid-ester groups, is generally very high and thus yields of at least 95 percent, desirably at least 98 percent, and often 99 and even 100 percent are achieved based upon the total amount of the glycol.

The alcohols utilized as a reactant are desirably a saturated, aliphatic monoalcohol having a total of from 2 to about 20 carbon atoms with from about 6 to about 10 carbon atoms being preferred. Representative examples of such alcohols include ethyl alcohol, propyl alcohol, butyl alcohol, amyl alcohol, hexyl alcohol, heptyl alcohol, octyl alcohol, 2-ethylhexyl alcohol, nonyl alcohol, decyl alcohol, dodecyl alcohol, and the like, including isomers thereof, with 2-ethyhexyl alcohol being preferred. The mole ratio of the alcohol to the dicarboxylic acid, or to each acid ester group if a two step reaction is utilized, is desirably from about 1.0 to about 1.1 or 1.2, and preferably about 1.0.

The solvent utilized can be any conventional solvent generally known to the art or to the literature utilized in the formation of esters. Such solvents are generally hydrocarbons and isoparaffins and preferably include aromatic solvents in which the dicarboxylic acid and the glycol are soluble. Examples of representative solvents include benzene, toluene, xylene, and mesitylene, with toluene being preferred. Desirably, the solvent utilized is miscible with water so that the water can be removed from the reaction product by azeotropic distillation. Whenever a solvent is utilized which forms an azeotrope, water can be readily separated therefrom as through the use of a Dean-Stark receiver. The amount of the solvent is generally not important but desirably is larger than the total amount of reactants. For example, anywhere from about 1 to about 5 liters of a solvent can be utilized for every mole of diacid.

Catalysts are often utilized to promote the reaction, that is, the formation of an ester by the reaction of the glycol and with the dicarboxylic acid as well as the reaction of the dicarboxylic acid and the monoalcohol. Condensation catalysts are preferred and include mineral acids such as sulfuric acid, hydrochloric acid, and the like. Organometallic and inorganic catalysts are also utilized such as dibutyltin oxide and manganese acetate. A preferred catalyst is p-toluenesulfonic acid. The amount of the catalyst is generally small, as for example, from about 0.1 to about 8 or 10 parts by weight, desirably from 0.5 to about 5 by weight, and preferably from about 0.75 to about 2 or 3 parts by weight per 100 parts by weight of reactants.

Numerous reaction and processing conditions can be utilized to form the product as well as various purification steps thereof. A desired method for a two step reaction is generally as follows: In the first reaction step, the above-indicated ratios of glycol and dicarboxylic acid are added to a reaction vessel generally containing a stirrer. The vessel also desirably contains a Dean-Stark receiver. To the reaction vessel is added a suitable amount of catalyst such as p-toluenesulfonic acid and an appropriate amount of a solvent such as toluene. The mixture is heated to a reaction temperature so that esterification occurs. Such a temperature is generally up to and including the boiling point of the solvent provided that a solvent is not utilized which has a high boiling point that would degrade either the reactants or the reaction product. The reaction is desirably continued until essentially all of the glycol has reacted. This can be readily determined by weighing the amount of water collected in the Dean-Stark receiver and comparing this amount to the theoretical amount which should be obtained by a complete reaction. The reaction vessel desirably contains a reflux condenser to maintain the toluene therein. Desirable reaction temperatures are generally from about 75 to about 165 degrees C and preferably from about 80 to about 110 degrees C. Reaction time is generally the time necessary to collect the water required for essentially a complete reaction. Once the reaction is completed, the toluene can be removed by distillation which also removes some of the generated water. The reaction product can be slightly cooled and then utilized in the second step.

To the reaction product of the first step, a desired amount of dry solvent, e.g. toluene and an appropriate amount of a mono alcohol is added. The solution is heated to an esterification reaction temperature which generally is from about 80° to about 165° C. and includes the boiling point of toluene. Desirably, the toluene is heated to reflux. The reaction is carried out until it is essentially complete, that is, the theoretical amount of water is obtained in the Dean-Stark receiver. The toluene can then be removed by distillation at atmospheric pressure. The remaining organic ester product is then cooled to room temperature and extracted with ether and water. Since the acidic catalysts are soluble in water, the ether extraction step separates the organic ester from the catalyst. Water containing a salt such as sodium chloride eliminates the removal of any remaining acidic catalysts without losing product. The ether layer is separated from the water layer and then treated to remove any remaining water by using a desiccant, for example, anhydrous magnesium sulfate. The ether layer is subsequently filtered to remove the magnesium sulfate and then evaporated to yield the organic ester product. The organic ester product is further dried by subjecting it to a high vacuum, for example, about 0.2 mm of mercury at a temperature of about 10020 to about 110° C. This step also removes the low boiling starting materials. The organic ester product remaining in the reaction vessel optionally is distilled at about 150° C. This end product, which may contain a small amount of polymeric material therein can be utilized as a plasticizer along with the extracted product.

In the one-step reaction route, all of the various ingredients, that is, the dicarboxylic acid, the glycol, the alcohol, as well as the catalysts and the solvent are added to a reaction vessel desirably having a stirrer therein and a water collection trap. The mixture is heated to at least the reaction temperature of the solvent which is generally from about 75° to about 165° C. up to the reflux temperature of the solvent provided that the same does not degrade the reactants or the product. The reaction is continued for a period of time until essentially complete reaction occurs. The reaction solution is concentrated by distilling off the solvent. The organic ester product can be obtained by the same manner as set forth with regard to the recovery and purification route of the second step of the two-step reaction procedure.

Regardless of whether the one-step or two-step route or procedure is utilized, the end product is essentially the same. That is, an organic ester which can be represented by the formula

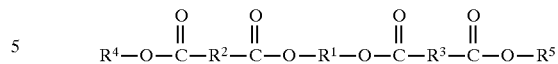

wherein $R^1$ is derived from a glycol or an ether glycol as set forth hereinabove having a total of from 2 to about 60 carbon atoms and wherein the ether has from about 1 to about 20 ether oxygen atoms; wherein $R^2$ and $R^3$, independently, is derived from a dicarboxylic acid having a total of from 2 to about 20 carbon atoms as set forth hereinabove; and wherein $R^4$ and $R^5$, independently, is derived from an alcohol having a total of from 2 to about 20 carbon atoms as set forth hereinabove. In the case wherein the dicarboxylic acid is oxalic acid, $R^2$ and $R^3$ will be nonexistent. Thus, $R^1$ is an alkylene having from 2 to about 60 and desirably from 2 to about 10 carbon atoms. Preferably, it is an ether having a total of from 2 to about 40 carbon atoms with from 1 to about 20 oxygen atoms therein. $R^2$ and $R^3$, independently, are a saturated alkylene having a total of from 0 to about 18 carbon atoms and preferably from about 6 to about 12 carbon atoms whereas $R^4$ and $R^5$, independently, are an alkyl having a total of from 2 to about 20 carbon atoms and preferably from about 6 to about 10 carbon atoms. Although the organic ester may contain small amounts of polymeric material, the same generally does not affect the properties of the plasticizer.

The organic esters of the present invention are suitable as plasticizers in rubber. Generally, any type of rubber can be utilized such as natural rubber, rubbers made from conjugated diene monomers having from 4 to about 10 carbon atoms such as butadiene, isoprene, hexadiene, and the like as well as combinations thereof. Another suitable class of rubbers are various copolymers made from conjugated diene monomers having from 4 to about 10 carbon atoms with vinyl substituted aromatic monomers having from about 8 to about 12 carbon atoms such as styrene, alpha-methylstyrene, and the like. A preferred class of rubber is the halogenated rubbers such as the various neoprenes, that is polymers and copolymers of chloroprene (2-chloro-1-3-butadiene).

The rubbers can be compounded with conventional rubber additives such as fillers, for example, carbon black, magnesium oxide, etc., various antioxidants, various processing aids, stearic acid, zinc oxide, process oils, vulcanization compounds such as sulfur, zinc oxide, various vulcanization accelerators such as thiazoles, thiurams, sulfenamides, guanidines, and the like. Generally, a master batch is formed, then curing compounds such as sulfur and various accelerators are added thereto and mixed, and a desired end product is formed and cured. The amount of the organic ester of the present invention which is utilized as a plasticizer in the rubber is generally from about 2 to about 50 parts by weight, desirably from about 5 to about 30 parts by weight and preferably from about 10 to about 25 parts by weight based upon 100 parts by weight of the rubber.

Cured rubbers containing the plasticizer of the present invention have been found to have low plasticizer volatility, good low temperature properties, and improved peel adhesion while generally maintaining all other physical properties. The cured rubber containing the organic esters of the present invention can be utilized wherever such rubbers have heretofore been utilized such as for air springs.

The invention will be better understood by reference to the following examples which serve to illustrate, but not to limit the scope of the present invention.

EXAMPLE 1

Two Step Preparation of an Organic Polyester Based Upon Sebaccic Acid, Dodecanoic Acid, Tetraethylene Glycol, and 2-Ethylhexanol:

STEP A:

| Ingredient | Equivalent | Eq. Weight | Grams |
|---|---|---|---|
| Dodecanedioic Acid | 0.475 | 115.15 | 54.696 |
| Sebaccic Acid | 0.500 | 101.125 | 50.563 |
| Tetraethylene Glycol | 0.500 | 97.12 | 48.558 |

Into a 1000 ml round bottom flask equipped with a mechanical stirrer, thermometer and a Dean-Stark Receiver was added the above materials and 500 ml of dry toluene and 2 grams of p-toluenesulfonic acid. The mixture was heated

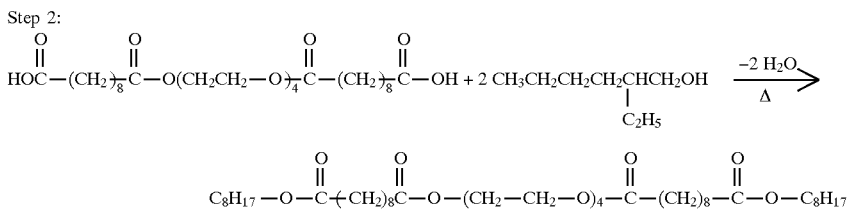

to the reflux temperature of toluene and held there until the theoretical amount of water was removed (8.8 ml). The flask was cooled slightly and 2-ethylhexanol (0.475 eq, 61.86 gm) was added. The reaction was reheated to reflux temperature and held there until the theoretical amount of water from the second reaction was removed (8.8 ml).

The time required for the first step was 16 hours. The time required for the second step was 8 hours.

EXAMPLE 2

Two Step Preparation of an Organic Ester Based on Sebaccic Acid, Tetraethylene Glycol and 2-Ethylhexanol The organic ester product was prepared by a two-step synthesis.

Step 1:

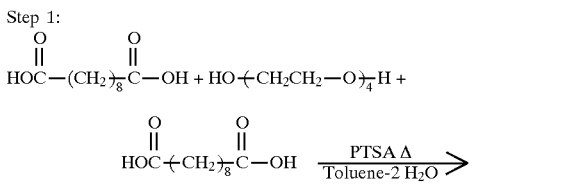

Into a 1 liter round bottom flask, equipped with a mechanical stirrer, thermometer and a Dean-Stark receiver, was charged 101.2 gm (0.5 mole) of sebaccic acid, 48.6 gm (0.25 mole) of tetraethylene glycol, 500 ml of toluene and 1 gm of p-toluenesulfonic acid (PTSA). The reaction was heated at the reflux temperature of toluene until the theoretical amount of water was collected in the Dean-Stark trap (9.0 ml). This required 19.5 hrs. The mixture was cooled slightly and the second step commenced.

65.2 gm of 2-ethylhexanol was added (0.55 moles). The solution was again heated to the reflux temperature of toluene and held there until the theoretical amount of water was removed (9.0 ml). This required 24 hrs. The solution, after cooling, was extracted with a saturated $NaHCO_3$ solution in water. The water layer was separated and the toluene layer dried over anhydrous $MgSO_4$ and then filtered. The filtrate was evaporated to remove the toluene on a steam bath. It was further dried by pulling a high vacuum on the product at a temperature of about 150° C. The vacuum was about 0.2 mm Hg. An IR and TGA were obtained on the product. Some evidence of higher molecular weight materials was observed in the TGA. The IR spectrum looked consistent with the expected compound.

EXAMPLE 3

One Step Preparation of an Organic Polyester Based on a High Purity Sebaccic Acid, Dodecanoic Acid, Tetraethylene Glycol, and 2-Ethylhexanol:

Into a 1 liter round bottom flask equipped with a mechanical stirrer, thermometer and a Dean-Stark receiving apparatus was added the following materials:

| COMPOUND | MOLES | WEIGHT (GM) |
|---|---|---|
| Dodecanedioic | 0.1 | 23.03 |
| Sebaccic Acid | 0.1 | 20.23 |
| Tetraethylene glycol | 0.1 | 19.42 |
| 2-Ethylhexanol | 0.2 | 26.05 |
| p-toluenesulfonic Acid | — | 1.0 |
| Toluene | — | 500 ml |

The mixture was heated at the reflux temperature of toluene until the theoretical amount of water was removed (7.2 gm ~0.4 mole). This required heating overnight. A total of 7.0 ml of water was removed (some was soluble in the toluene). The solution was concentrated by distilling off 300 ml of toluene. The solution was then neutralized by adding 25 ml of a saturated solution of NaHCO$_3$. The solution was stirred vigorously for about 15 minutes. The solution was dried over anhydrous Mg SO$_4$ and then filtered through a Celite filter aid. The product was stripped of the remaining toluene and then partially distilled under reduced pressure (~0.2 mm mercury) at a pot temperature of ~285° C.

The yield of the distilled fraction was 20 gm (25.27%) and the yield of the residue that remained in the reaction vessel was 58.6 gm (71.88%). The total yield was 97.15%.

As a control, dioctyl sebaccate was utilized as a plasticizer. A standard neoprene recipe was utilized for a master batch as set forth in Table I with the control plasticizer, and also with the plasticizers of Examples 1 and 2. The compounds of Table I were blended and mixed in a standard manner. To the master batch was then added the noted final compounds, i.e. antioxidants, sulfur, etc., and the same were also mixed in a standard manner, made into a desired shape, and then subsequently cured at 155° C. for 15 minutes. The samples were tested with regard to physical properties and the results thereof are set forth in Table II.

TABLE I

|  | Control | Ex. 1 | Ex. 2 |
|---|---|---|---|
| COMPOUND/Masterbatch |  |  |  |
| Neoprene 1 | 70 | 70 | 70 |
| Neoprene 2 | 30 | 30 | 30 |
| Extended Factice/a processing aid | 10 | 10 | 10 |
| Carbon Black | 35 | 35 | 35 |
| MgO | 4 | 4 | 4 |
| A Low Molecular Weight Processing Aid | 4 | 4 | 4 |
| Antioxidant | 2 | 2 | 2 |
| Stearic Acid | 0.5 | 0.5 | 0.5 |
| Dioctyl Sebaccate Plasticizer (Control) | 15 | — | — |
| Plasticizer of Example 1 | — | 15 | — |
| Plasticizer of Example 2 | — | — | 15 |
| TOTAL Masterbatch | 170.5 | 170.5 | 170.5 |
| COMPOUND/Final |  |  |  |
| Masterbatch | 170.5 | 170.5 | 170.5 |
| Antioxidant-#1 | 1.50 | 1.50 | 1.50 |
| Antioxidant #2 | 0.25 | 0.25 | 0.25 |
| Zinc Oxide | 5.0 | 5.0 | 5.0 |
| Sulfur | 1.00 | 1.00 | 1.00 |
| Accelerator #1 | 1.00 | 1.00 | 1.00 |
| Accelerator #2 | 0.50 | 0.50 | 0.50 |
| Total Final | 179.75 | 179.75 | 179.75 |

TABLE II

| STOCK | Control | Ex. 1 | Ex. 2 |
|---|---|---|---|
| Low Mooney | 1.07 | 1.13 | 1.06 |
| Time to Scorch | 5:02 | 4:48 | 4:49 |
| Time Cure to 50% | 8:59 | 8:41 | 8:47 |
| Cure | 1.05 | 0.90 | 1.20 |
| Max Mooney | 10.81 | 10.88 | 10.93 |
| Time Cure at 90% | 25:39 | 25:36 | 26:35 |
| Mooney ML$_{1+4}$ @ 100° C. | 36.6 | 39.7 | 38.6 |
| Peel Adhesion Results: (Stock to Stock) |  |  |  |
| Pli (average of 2) | 42.50 | 57.72 | 49.80 |
| Peak (pli) | 49.27 | 70.22 | 59.04 |
| Failure mode | cord/black | Cord/black & rubber tear | cord/black |
| Improvement, % | — | +35.8 | +17.2 |

TABLE II-continued

| STOCK | Control | Ex. 1 | Ex. 2 |
|---|---|---|---|
| Pendulum Rebound: |  |  |  |
| @ 73° F. (23° C.) | 52.6 | 49.8 | 49.2 |
| @ 212° F. (100° C.) | 59.8 | 60.0 | 59.2 |
| Shore A Durometer: |  |  |  |
| @ 73° F. (23° C.) | 47.5 | 48.9 | 49.2 |
| @ 212° F. (100° C.) | 43.5 | 45.0 | 45.0 |
| Brittle Point (°C.) |  |  |  |
| Temperature (°C.) | −43.5 | −42.5 | −42.5 |
| @ 73° F. (23° C.) |  |  |  |
| 100% Mod., psi | 231 | 219 | 245 |
| 200% Mod., psi | 565 | 535 | 587 |
| 300% Mod., psi | 1032 | 967 | 1047 |
| Ten. Stren., psi | 2141 | 2000 | 2221 |
| Ult. Elong., % | 533 | 532 | 543 |
| @ 212° F. (100° C.) |  |  |  |
| 100% Mod., psi | 180 | 188 | 179 |
| 200% Mod., psi | 395 | 410 | 383 |
| 300% Mod., psi | 703 | 724 | 675 |
| Ten. Stren., psi | 1078 | 1126 | 1120 |
| Ult. Elong., % | 411 | 417 | 436 |
| Weight Loss (average of two samples) grams | 0.965 | 0.920 | 0.465 |
| Percent | 100 | 95 | 48 |

The above data was generated utilizing ASTM methods and tests.

As apparent from the above data, improved results were obtained with regard to peel adhesion. Moreover, the blended rubber compositions utilizing the organic ester plasticizers of the present invention had lower weight loss due to low volatility of the plasticizer of the present invention.

While in accordance with the patent statutes the best mode and preferred embodiment has been set forth, the scope of the invention is not limited thereto, but rather by the scope of the attached claims.

What is claimed is:
1. A polyester, comprising;
a compound having the formula

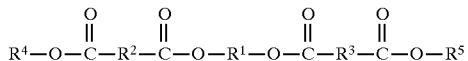

wherein
R$^1$ is an aliphatic or an aliphatic ether having a total of from 2 to about 60 carbon atoms, wherein R$^2$ and R$^3$, independently, are an aliphatic having a total of from 0 to about 18 carbon atoms, and wherein R$^4$ and R$^5$, independently, are an aliphatic derived from a monoalcohol having a total of from 2 to about 20 carbon atoms.
2. A polyester according to claim 1, wherein said R$^1$ is saturated.
3. A polyester according to claim 2, wherein said R$^2$ and R$^3$, independently, are saturated and contain from about 6 to about 12 carbon atoms, and wherein said R$^4$ and R$^5$, independently, are saturated and contain from about 6 to about 10 carbon atoms.
4. A polyester according to claim 3, wherein said R$^1$ is said ether and has a total of from 2 to about 40 carbon atoms.
5. A polyester according to claim 4, wherein said R$^1$ is derived from tetraethylene glycol, wherein said R$^2$ and R$^3$ has 8 or 10 carbon atoms, or combinations thereof, and wherein R$^4$ and R$^5$ each contain 8 carbon atoms.

6. A polyester, comprising;
the reaction product of a monoalcohol and an acid ester, said acid ester being the reaction product of a glycol and an aliphatic dicarboxylic acid.

7. A polyester according to claim 6, wherein said glycol is a hydrocarbon glycol or an ether glycol having from 2 to about 60 carbon atoms, wherein the mole ratio of said dicarboxylic acid to said glycol is approximately 2.0, and wherein the mole ratio of said monoalcohol to each said acid ester is approximately 1.0.

8. A polyester according to claim 7, wherein said glycol is a saturated glycol, wherein said dicarboxylic acid is a saturated aliphatic dicarboxylic acid having from 2 to about 20 carbon atoms, and wherein said monoalcohol is a saturated aliphatic alcohol having from 2 to about 20 carbon atoms.

9. A polyester according to claim 8, wherein said glycol is said ether glycol and has from 2 to about 40 carbon atoms, wherein said dicarboxylic acid has from about 8 to about 14 carbon atoms, wherein said monoalcohol has from about 6 to about 10 carbon atoms, wherein the mole ratio of said dicarboxylic acid to said ether glycol is from about 1.95 to about 2.05, and wherein the mole ratio of said monoalcohol to said acid ester is from about 1.0 to about 1.1.

10. A polyester according to claim 9, wherein said ether glycol is tetraethylene glycol, wherein said dicarboxylic acid is sebaccic acid, or dodecanoic acid, or combinations thereof, and wherein said monoalcohol is 2-ethylhexanol.

11. A polyester, comprising;
the reaction product of a glycol, an aliphatic dicarboxylic acid, and a monoalcohol.

12. A polyester according to claim 11, wherein said glycol has from 2 to about 60 carbon atoms, wherein said dicarboxylic acid has from 2 to about 20 carbon atoms, and wherein said alcohol has from 2 to about 20 carbon atoms.

13. A polyester according to claim 12, wherein the mole ratio of said alcohol to said dicarboxylic acid is approximately 1.0, wherein said glycol is saturated and is an ether glycol having from about 2 to about 40 carbon atoms, wherein said dicarboxylic acid is saturated and has from about 8 to about 14 carbon atoms, and wherein said alcohol is saturated and has from about 6 to about 10 carbon atoms.

14. A polyester according to claim 13, wherein the mole ratio of said dicarboxylic acid to said glycol is approximately 2.0, and wherein the mole ratio of said alcohol to said dicarboxylic acid is from about 1.0 to about 1.1.

15. A polyester according to claim 14, wherein the mole ratio of said dicarboxylic acid to said glycol is from about 1.95 to about 2.05, wherein said ether glycol is tetraethylene glycol, wherein said dicarboxylic acid is sebaccic acid, or dodecanoic acid, or combinations thereof, and wherein said alcohol is 2-ethylhexanol.

16. A plasticized rubber containing a plasticizer which is the polyester of claim 1.

17. A plasticized rubber wherein said rubber is natural rubber, a rubber polymerized from one or more conjugated dienes having from 4 to 10 carbon atoms, a rubber polymerized from one or more conjugated dienes having from 4 to 10 carbon atoms and one or more vinyl substituted aromatic compounds having from 8 to 12 carbon atoms, or a halogen containing rubber, or combinations thereof, and wherein said plasticizer is the polyester of claim 3.

18. A plasticized rubber wherein said rubber is neoprene, wherein said plasticizer is the polyester of claim 5, and wherein said neoprene contains from about 5 to about 30 parts by weight of said plasticizer per 100 parts by weight of said neoprene.

19. A plasticized rubber containing a plasticizer which is a polyester of claim 6.

20. A plasticized rubber wherein said rubber is a natural rubber, a rubber polymerized from one or more conjugated dienes having from 4 to 10 carbon atoms, a rubber polymerized from one or more conjugated dienes having from 4 to 10 carbon atoms and one or more vinyl substituted aromatic compounds having from 8 to 12 carbon atoms, or a halogen containing rubber, or combinations thereof, and wherein said plasticizer is the polyester of claim 9.

* * * * *